United States Patent
Takemura

(10) Patent No.: US 7,438,977 B2
(45) Date of Patent: Oct. 21, 2008

(54) GIBBSITE TYPE ALUMINUM HYDROXIDE PARTICLES HAVING HIGH OIL ABSORPTION

(75) Inventor: Kazuki Takemura, Niihama (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 11/602,220

(22) Filed: Nov. 21, 2006

(65) Prior Publication Data

US 2007/0116641 A1    May 24, 2007

(30) Foreign Application Priority Data

Nov. 24, 2005    (JP) .............................. 2005-338259

(51) Int. Cl.
*B32B 5/16* (2006.01)
*C01F 7/02* (2006.01)
*C01F 7/14* (2006.01)
*C01F 7/34* (2006.01)

(52) U.S. Cl. ..................... 428/402; 423/111; 423/625; 423/627; 423/629

(58) Field of Classification Search ................. 423/111, 423/625, 627, 629; 428/402
See application file for complete search history.

(56) References Cited

U.S. PATENT DOCUMENTS

| | | | | |
|---|---|---|---|---|
| 3,826,775 | A * | 7/1974 | Sobolev et al. | 524/107 |
| 4,340,579 | A * | 7/1982 | Greber et al. | 423/625 |
| 4,421,876 | A * | 12/1983 | Greber et al. | 523/402 |
| 4,612,184 | A | 9/1986 | Seigneurin | |
| 4,847,064 | A * | 7/1989 | Pearson | 423/625 |
| 4,900,537 | A * | 2/1990 | Wilhelmy | 423/629 |
| 5,100,641 | A * | 3/1992 | Schmidt et al. | 423/624 |
| 6,280,839 | B1 * | 8/2001 | Brown et al. | 428/328 |
| 6,382,538 | B1 * | 5/2002 | Nippa et al. | 241/30 |
| 6,514,477 | B2 * | 2/2003 | Brown et al. | 423/629 |
| 6,573,323 | B2 * | 6/2003 | Kikuchi et al. | 524/437 |
| 7,144,941 | B2 * | 12/2006 | Sauerwein et al. | 524/437 |

FOREIGN PATENT DOCUMENTS

| | | |
|---|---|---|
| JP | 3-8715 A | 1/1991 |
| JP | 2005-35878 | 2/2005 |

* cited by examiner

*Primary Examiner*—H. T Le
(74) *Attorney, Agent, or Firm*—Sughrue Mion, PLLC

(57) ABSTRACT

The present invention provides gibbsite type aluminum hydroxide particles having a primary particle diameter of from 0.01 μm to 0.3 μm and a DOP oil absorption of from 90 mL/100 g to 300 mL/100 g.

7 Claims, No Drawings

GIBBSITE TYPE ALUMINUM HYDROXIDE PARTICLES HAVING HIGH OIL ABSORPTION

BACKGROUND OF THE INVENTION

1. Field of the Invention

The present invention relates to gibbsite type aluminum hydroxide particles and in particular to aluminum hydroxide particles used preferably as a flame retardant filled in resin.

2. Description of the Related Art

Gibbsite type aluminum hydroxide particles are useful as a flame retardant filled in resin. For example, JP-A-3-8715 discloses that gibbsite type aluminum hydroxide particles having an average primary particle diameter of 0.15 μm or less can be used as a flame retardant.

As gibbsite type aluminum hydroxide particles, however, there is a demand for those more excellent in flame retardancy.

SUMMARY OF THE INVENTION

An object of the present invention is to provide gibbsite type aluminum hydroxide particles that show higher flame retardancy.

The present invention provides gibbsite type aluminum hydroxide particles having a primary particle diameter of from 0.01 μm to 0.3 μm and a DOP oil absorption of from 90 mL/100 g to 300 mL/100 g.

The gibbsite type aluminum hydroxide particles of the present invention exhibit higher flame retardancy and are thus useful as a flame retardant used by filling in resin.

DETAILED DESCRIPTION OF THE INVENTION

The gibbsite type aluminum hydroxide particles of the present invention are particles of aluminum hydroxide with a gibbsite type crystal structure as main crystal phase, which is a compound represented by the chemical formula $Al_2O_3 \cdot 3H_2O$. The crystal structure can be examined by powder X-ray diffractometry (powder XRD method).

The primary particle diameter of the gibbsite type aluminum hydroxide particles of the present invention is from 0.01 μm to 0.3 μm, preferably 0.03 μm or more and 0.2 μm or less, more preferably 0.1 μm or less. When the primary particle diameter is smaller or larger, sufficient flame retardancy is not obtained. The primary particle diameter can be measured, for example, from a microphotograph obtained by a transmission electron microscope (TEM).

The DOP oil absorption of the gibbsite type aluminum hydroxide particles of the present invention is from 90 mL/100 g to 300 mL/100 g, preferably from 100 mL/100 g to 180 mL/100g. When the DOP oil absorption is less, flame retardancy tends to be insufficient, while when the oil absorption is higher, the particles, when added to resin in a heated molten state, tend to lower their fluidity to make molding thereof difficult.

An average secondary particle diameter of the gibbsite type aluminum hydroxide particles of the present invention is usually 0.1 μm or more, preferably 10 μm or less, more preferably 5 μm or less. The average secondary particle diameter can be determined by measuring the aluminum hydroxide particles dispersed in water, with a laser scattering particle size distribution meter. When the average secondary particle diameter is too large, a resin composition obtained by filling the particles in resin may be inferior in physical properties.

When the particles of the present invention contain secondary particles having a particle diameter larger than 45 μm, a resin composition obtained by filling the particles in resin may also be inferior in physical properties, and so the particles contain the secondary particles having a particle diameter larger than 45 μm in an amount of preferably 0.1 mass % or less, more preferably 0 mass % (that is to say the particles of the present invention more preferably do not contain such large secondary particles). The content of the secondary particles having a particle diameter larger than 45 μm can be determined, for example, by observation under an electron microscope.

A BET specific surface area of the gibbsite type aluminum hydroxide particles of the present invention is preferably from 15 $m^2$/g to 100 $m^2$/g.

The gibbsite type aluminum hydroxide particles of the present invention can be produced by partially neutralizing an aqueous solution of sodium aluminate thereby precipitating aluminum hydroxide to form aluminum hydroxide slurry and subjecting the slurry to aging treatment at from 40° C. to 90° C.

The aluminum content of the aqueous solution of sodium aluminate is usually from 100 g/L to 150 g/L in terms of $Al_2O_3$ based on the aqueous solution. The sodium content thereof is usually from 100 g/L to 150 g/L in terms of $Na_2O$ based on the aqueous solution.

The partial neutralization can be practiced by, for example, adding an aluminum acidic salt thereto. The aluminum acidic salt is a salt exhibiting acidity when it alone is dissolved in water, and examples thereof include aluminum sulfate, aluminum chloride, aluminum nitrate etc. The weight (W) of the aluminum acidic salt to be used is in such an extent that aluminum hydroxide can be precipitated without completely neutralizing the aqueous solution of sodium aluminate, and specifically neutralization molar ratio ($=W/W_0$) given by the ratio of the weight (W) to the weight ($W_0$) of the aluminum acidic salt required for completely neutralizing the aqueous solution of sodium aluminate is about from 0.3 to 0.7. The temperature at which the aluminum acidic salt is added is usually about from 0° C. to 40° C. The aluminum acidic salt is added preferably under stirring.

By adding the aluminum acidic salt, the aqueous solution of sodium aluminate is neutralized thereby precipitating aluminum hydroxide to give aluminum hydroxide slurry having aluminum hydroxide dispersed in water.

The resulting aluminum hydroxide slurry is subjected to aging treatment. The aging treatment is carried out by heating at from 40° C. to 90° C. The time required for aging treatment is usually about from 5 hours to 7 days. By aging, the precipitated aluminum hydroxide can be converted gradually into gibbsite to give the gibbsite type aluminum hydroxide particles of the present invention.

The resulting gibbsite type aluminum hydroxide particles can be fetched as solids, for example, by subjecting the aged slurry to solid/liquid separation by centrifugation. The fetched gibbsite type aluminum hydroxide particles are preferably further washed with pure water or alcohols such as methanol to remove sodium residue therefrom.

The gibbsite type aluminum hydroxide particles of the present invention can be preferably used as a flame retardant to be filled in resin, and a resin composition containing the aluminum hydroxide particles of the present invention, namely a resin composition obtained by filling the aluminum hydroxide particles of the present invention in resin, is excellent in flame retardancy.

The resin may be thermoplastic resin or thermosetting resin.

Examples of the thermoplastic resin include olefin resins, for example, olefin homopolymers such as polyethylene, polypropylene and polybutene, and olefin copolymers such as ethylene-propylene random copolymers, ethylene-propylene block copolymers, propylene-butene random copolymers, propylene-butene block copolymers, and ethylene-propylene-butene copolymers; aromatic polyesters such as polyethylene terephthalate and polybutylene terephthalate; polyesters such as polycaprolactam and polyhydroxy butyrate; and polyamides such as nylon-6, nylon-66, nylon-10, nylon-12 and nylon-46.

Examples of the thermosetting resin include epoxy resin; vinyl ester resin; phenol resin; unsaturated polyester resin; polyimide; polyurethane and melamine resin.

The amount of the gibbsite type aluminum hydroxide particles to be filled is usually about from 30 to 150 parts by mass per 100 parts by mass of the resin.

The method of filling the gibbsite type aluminum hydroxide particles of the present invention in resin is not particularly limited and can be suitably selected depending on the type of resin. For example, when the gibbsite type aluminum hydroxide particles of the present invention is filled in thermoplastic resin, the thermoplastic resin may be mixed with the gibbsite type aluminum hydroxide particles of the present invention, then melted by heating and kneaded.

EXAMPLES

Hereinafter, the present invention is described in more detail by reference to the Examples, but the present invention is not limited by the Examples.

The DOP oil absorption of the aluminum hydroxide particles obtained in each of the Examples was determined in the same manner as in Oil Absorption B Method (paddle-kneading method) in JIS K6221 (1982) except that DOP (dioctyl phthalate) was used in place of DBP (dibutyl phthalate).

The primary particle diameter was determined from a transmission electron microphotograph.

The main crystal phase was determined from a peak showing the highest relative peak intensity in an X-ray diffraction spectrum obtained by means of an X-ray diffractometer (RAD-RB RU-200 manufactured by Rigaku Corporation).

The average secondary particle diameter was determined as 50 mass % particle diameter by dispersing the aluminum hydroxide particles in pure water and obtaining a particle size distribution curve by a laser scattering particle size distribution meter (Microtruck HRA manufactured by Lead & Northrup Company).

The BET specific surface area was determined by the nitrogen adsorption method.

The oxygen index of a resin composition was determined according to JIS K7201.

Example 1

[Production of Aluminum Hydroxide Particles]

When 612 parts by mass of 5.3 mass % aqueous aluminum sulfate solution was added to 1209 parts by mass of an aqueous solution of sodium aluminate containing 132 g/L of sodium (calculated in terms of $Na_2O$) and 136 g/L of aluminum (calculated in terms of $Al_2O_3$) at 25° C., aluminum hydroxide was precipitated. Thereafter, the mixture was stirred at the same temperature for 60 minutes. The amount of aluminum sulfate used was 0.51-fold relative to the amount of aluminum sulfate required for completely neutralizing the aqueous solution of sodium aluminate.

Then, 1000 parts by mass of pure water was added thereto, and the mixture was heated to 60° C., aged by leaving it at the same temperature for 4 days, then cooled to room temperature (about 25° C.) and subjected to solid-liquid separation by centrifugation, to fetch solids. The solids thus obtained were washed by repeating thrice the operation that involved adding 2820 parts by mass of pure water to the solids, stirring the mixture and then subjecting it to solid-liquid separation by centrifugation. After washing, the solids were dried at 120° C. in the air and pulverized by a pulverizer (Rotor Speed Mill manufactured by Fritsch & Co.) to give aluminum hydroxide particles.

The DOP oil absorption of the resulting aluminum hydroxide particles was 158 mL/100 g, the primary particle diameter was approximately 0.2 μm, and the main crystal phase was a gibbsite type. The average secondary particle diameter was 0.5 μm, secondary particles having a particle diameter larger than 45 μm were not contained therein, and the BET specific surface area was 20 $m^2/g$.

[Production of a Resin Composition]

50 Parts by mass of the aluminum hydroxide particles obtained above were mixed with 100 parts by mass of pellet-shaped low-density polyethylene (FS-150 manufactured by Sumitomo Chemical Co., Ltd.) and melt-kneaded at 160° C. at a screw revolution rate of 40 rpm with a kneader (Laboplast Mill manufactured by Toyo Seiki Seisaku-Sho, Ltd.) to give a resin composition. The oxygen index of this resin composition was 21.9%. The results are shown in Table 1.

Example 2

[Production of Aluminum Hydroxide Particles]

When 573 parts by mass of 5.3 mass % aqueous aluminum sulfate solution was added to 1209 parts by mass of an aqueous solution of sodium aluminate containing 129 g/L of sodium (calculated in terms of $Na_2O$) and 134 g/L of aluminum (calculated in terms of $Al_2O_3$) at 4° C., aluminum hydroxide was precipitated. Thereafter, the mixture was stirred under cooling on ice for 60 minutes. The amount of aluminum sulfate used was 0.41-fold relative to the amount of aluminum sulfate required for completely neutralizing the aqueous solution of sodium aluminate.

Then, 1000 parts by mass of pure water was added thereto, and the mixture was heated to 45° C., aged by leaving it at the same temperature for 4 days, then cooled to room temperature (about 25° C.) and subjected to solid-liquid separation by centrifugation, to fetch solids. The solids thus obtained were washed by repeating thrice the operation that involved adding 2930 parts by mass of pure water to the solids, stirring the mixture and then subjecting it to solid-liquid separation by centrifugation. After washing, the solids were dried at 120° C. in the air and pulverized by a pulverizer (Rotor Speed Mill manufactured by Fritsch & Co.) to give aluminum hydroxide particles.

The DOP oil absorption of the resulting aluminum hydroxide particles was 129 mL/100 g, the primary particle diameter was approximately 0.05 μm, and the main crystal phase was a gibbsite type. The average secondary particle diameter was 6.3 μm, secondary particles having a particle diameter larger than 45 μm were not contained therein, and the BET specific surface area was 59 $m^2/g$.

[Production of a Resin Composition]

A resin composition was obtained by the same operation as in Example 1 except that 50 parts by mass of the aluminum hydroxide particles obtained above were used in place of the aluminum hydroxide particles obtained in Example 1. The oxygen index of this resin composition was 21.9%. The results are shown in Table 1.

Example 3

[Production of Aluminum Hydroxide Particles]

When 612 parts by mass of 5.3 mass % aqueous aluminum sulfate solution was added to 1213 parts by mass of an aqueous solution of sodium aluminate containing 131 g/L of sodium (calculated in terms of $Na_2O$) and 134 g/L of aluminum (calculated in terms of $Al_2O_3$) at 7° C., aluminum hydroxide was precipitated. Thereafter, the mixture was stirred under cooling on ice for 60 minutes. The amount of aluminum sulfate used was 0.51-fold relative to the amount of aluminum sulfate required for completely neutralizing the aqueous solution of sodium aluminate.

Then, 330 parts by mass of pure water was added thereto, and the mixture was heated to 60° C., aged by leaving it at the same temperature for 2 days, then cooled to room temperature (about 25° C.) and subjected to solid-liquid separation by centrifugation, to fetch solids. The solids thus obtained were washed by repeating thrice the operation that involved adding 3590 parts by mass of pure water to the solids, stirring the mixture and then subjecting it to solid-liquid separation by centrifugation. After washing, the solids were dried at 120° C. in the air and pulverized by a pulverizer (Rotor Speed Mill manufactured by Fritsch & Co.) to give aluminum hydroxide particles.

The DOP oil absorption of the resulting aluminum hydroxide particles was 152 mL/100 g, the primary particle diameter was approximately 0.1 μm, and the main crystal phase was a gibbsite type. The average secondary particle diameter was 0.3 μm, secondary particles having a particle diameter larger than 45 μm were not contained therein, and the BET specific surface area was 32 $m^2/g$.

[Production of a Resin Composition]

A resin composition was obtained by the same operation as in Example 1 except that 50 parts by mass of the aluminum hydroxide particles obtained above were used in place of the aluminum hydroxide particles obtained in Example 1. The oxygen index of this resin composition was 22.4%. The results are shown in Table 1.

Comparative Example 1

[Production of a resin composition]

A resin composition was obtained by the same operation as in Example 1 except that 50 parts by mass of commercial gibbsite type aluminum hydroxide particles (C-301, with a DOP oil absorption of 62 L/100 g, a primary particle diameter of about 0.5 μm, an average secondary particle diameter of 1.4 μm and a BET specific surface area of 6 $m^2/g$, free of secondary particles having a particle diameter greater than 45 μm, manufactured by Sumitomo Chemical Co., Ltd.) were used in place of the aluminum hydroxide particles obtained in Example 1. The oxygen index of this resin composition was 20.5%.

TABLE 1

|  | Examples | | | Comparative |
|---|---|---|---|---|
|  | 1 | 2 | 3 | Example 1 |
| Aluminum hydroxide particles | | | | |
| DOP oil absorption (mL/100 g) | 158 | 129 | 152 | 62 |
| Primary particle diameter (μm) | 0.2 | 0.05 | 0.1 | 0.5 |
| Average secondary particle diameter (μm) | 0.5 | 6.3 | 0.3 | 1.4 |
| BET specific surface area ($m^2/g$) | 20 | 59 | 32 | 6 |
| Resin composition | | | | |
| Aluminum hydroxide particles (parts by mass) | 50 | 50 | 50 | 50 |
| Low-density polyethylene (parts by mass) | 100 | 100 | 100 | 100 |
| Oxygen index (%) | 21.9 | 21.9 | 22.4 | 20.5 |

Example 4

[Production of Aluminum Hydroxide Particles]

When 573 parts by mass of 5.3 mass % aqueous aluminum sulfate solution was added to 1358 parts by mass of an aqueous solution of sodium aluminate containing 131 g/L of sodium (calculated in terms of $Na_2O$) and 137 g/L of aluminum (calculated in terms of $Al_2O_3$) at 20° C., aluminum hydroxide was precipitated. Thereafter, the mixture was stirred at the same temperature for 60 minutes. The amount of aluminum sulfate used was 0.40-fold relative to the amount of aluminum sulfate required for completely neutralizing the aqueous solution of sodium aluminate.

Then, 500 parts by mass of pure water was added thereto, and the mixture was heated to 60° C., aged by leaving it at the same temperature for 4 days, then cooled to room temperature (about 25° C.) and subjected to solid-liquid separation by centrifugation, to fetch solids. The solids thus obtained were washed by repeating thrice the operation that involved adding 3990 parts by mass of pure water to the solids, stirring the mixture and then subjecting it to solid-liquid separation by centrifugation. After washing, the solids were dried at 120° C. in the air and pulverized by a pulverizer (Rotor Speed Mill manufactured by Fritsch & Co.) to give aluminum hydroxide particles.

The DOP oil absorption of the resulting aluminum hydroxide particles was 114 mL/100 g, the primary particle diameter was approximately 0.1 μm, and the main crystal phase was a gibbsite type. The average secondary particle diameter was 0.8 μm, secondary particles having a particle diameter larger than 45 μm were not contained therein, and the BET specific surface area was 23 $m^2/g$.

[Production of a Resin Composition]

A resin composition was obtained by the same operation as in Example 1 except that 110 parts by mass of the aluminum hydroxide particles obtained above were used in place of the aluminum hydroxide particles obtained in Example 1. The oxygen index of this resin composition was 27.6%. The results are shown in Table 2.

Example 5

[Production of Aluminum Hydroxide Particles]

When 573 parts by mass of 5.3 mass % aqueous aluminum sulfate solution was added to 1358 parts by mass of an aqueous solution of sodium aluminate containing 131 g/L of sodium (calculated in terms of $Na_2O$) and 137 g/L of aluminum (calculated in terms of $Al_2O_3$) at 20° C., aluminum hydroxide was precipitated. Thereafter, the mixture was stirred at the same temperature for 60 minutes. The amount of aluminum sulfate used was 0.40-fold relative to the amount of aluminum sulfate required for completely neutralizing the aqueous solution of sodium aluminate.

Then, 500 parts by mass of pure water was added thereto, and the mixture was heated to 60° C., aged by leaving it at the same temperature for 4 days, then cooled to room temperature (about 25° C.) and subjected to solid-liquid separation by centrifugation, to fetch solids. The solids thus obtained were washed by repeating thrice the operation that involved adding 3990 parts by mass of pure water to the solids, stirring the mixture and then subjecting it to solid-liquid separation by centrifugation. After washing, the solids were dried at 120° C. in the air and pulverized by a pulverizer ("Jiyu Funsaiki" (Free Grinding Machine) manufactured by Nara Machinery Co., Ltd.) to give aluminum hydroxide particles.

The DOP oil absorption of the resulting aluminum hydroxide particles was 112 mL/100 g, the primary particle diameter was approximately 0.1 μm, and the main crystal phase was a gibbsite type. The average secondary particle diameter was 0.4 μm, secondary particles having a particle diameter greater than 45 μm were not contained therein, and the BET specific surface area was 17 m$^2$/g.

[Production of a Resin Composition]

A resin composition was obtained by the same operation as in Example 1 except that 110 parts by mass of the aluminum hydroxide particles obtained above were used in place of the aluminum hydroxide particles obtained in Example 1. The oxygen index of this resin composition was 26.2%. The results are shown in Table 2.

Comparative Example 2

[Production of a Resin Composition]

A resin composition was obtained by the same operation as in Comparative Example 1 except that the amount of the aluminum hydroxide particles (C-301) used was changed into 110 parts by mass. The oxygen index of this resin composition was 23.8%.

TABLE 2

|  | Examples | | Comparative |
| --- | --- | --- | --- |
|  | 4 | 5 | Example 2 |
| Aluminum hydroxide particles | | | |
| DOP oil absorption (mL/100 g) | 114 | 112 | 62 |
| Primary particle diameter (μm) | 0.1 | 0.1 | 0.5 |
| Average secondary particle diameter (μm) | 0.8 | 0.4 | 1.4 |
| BET specific surface area (m$^2$/g) | 23 | 17 | 6 |
| Resin composition | | | |
| Aluminum hydroxide particles (parts by mass) | 110 | 110 | 110 |
| Low-density polyethylene (parts by mass) | 100 | 100 | 100 |
| Oxygen index (%) | 27.6 | 26.2 | 23.8 |

What is claimed is:

1. Gibbsite type aluminum hydroxide particles having a primary particle diameter of from 0.01 μm to 0.3 μm and a DOP oil absorption of from 90 mL/100 g to 300 mL/100 g.

2. The gibbsite type aluminum hydroxide particles according to claim 1, which has a BET specific surface area of from 15 m$^2$/g to 100 m$^2$/g.

3. A process for producing the gibbsite type aluminum hydroxide particles of claim 1, which comprises partially neutralizing an aqueous solution of sodium aluminate thereby precipitating aluminum hydroxide to form aluminum hydroxide slurry and subjecting the aluminum hydroxide slurry to aging treatment at from 40° C. to 90° C.

4. The process according to claim 3, wherein the aluminum content of the aqueous solution of sodium aluminate is from 100 g/L to 150 g/L in terms of $Al_2O_3$ based on the aqueous solution, and the sodium content thereof is from 100 g/L to 150 g/L in terms of $Na_2O$ based on the aqueous solution.

5. The process according to claim 3 or 4, wherein the partially neutralizing is practiced by adding an aluminum acidic salt.

6. The process according to claim 5, wherein neutralization molar ratio ($=W/W_0$) given by the ratio of the weight (W) of the aluminum acidic salt used to the weight ($W_0$) of the aluminum acidic salt required for completely neutralizing the aqueous solution of sodium aluminate is 0.3 to 0.7.

7. A resin composition containing the gibbsite type aluminum hydroxide particles of claim 1 or 2.

* * * * *